United States Patent [19]

Louzil

[11] 4,018,398
[45] Apr. 19, 1977

[54] WINDING HUB FOR A RECORD CARRIER IN THE FORM OF A TAPE
[75] Inventor: Friedrich Louzil, Vienna, Austria
[73] Assignee: U.S. Philips Corporation, New York, N.Y.
[22] Filed: Sept. 30, 1975
[21] Appl. No.: 618,217
[30] Foreign Application Priority Data
  Oct. 3, 1974  Austria ............................ 7982/74
[52] U.S. Cl. ................................................ 242/74.1
[51] Int. Cl.² ........................................ B65H 75/28
[58] Field of Search ................. 242/74, 74.1, 74.2, 242/125.1
[56] References Cited
UNITED STATES PATENTS 3,326,483  6/1967  Ivans ............................. 242/74 X
3,889,894  6/1975  Deguchi ............................ 242/74

Primary Examiner—Stanley N. Gilreath
Assistant Examiner—John M. Jillions
Attorney, Agent, or Firm—Frank R. Trifari; David R. Treacy

[57] ABSTRACT

A winding hub assembly for a record carrier in the form of a tape. One end of the tape can be inserted into and clamped in a circumferential recess in the winding hub with the aid of a clamping member, the hub having a further recess for a further clamping member adjacent to said first recess, the portion of the winding hub between the two recesses being elastically movable. The end of the record carrier is effectively clamped in position in the first recess through the action of the further clamping member in the further recess biasing the intervening hub portion.

2 Claims, 1 Drawing Figure

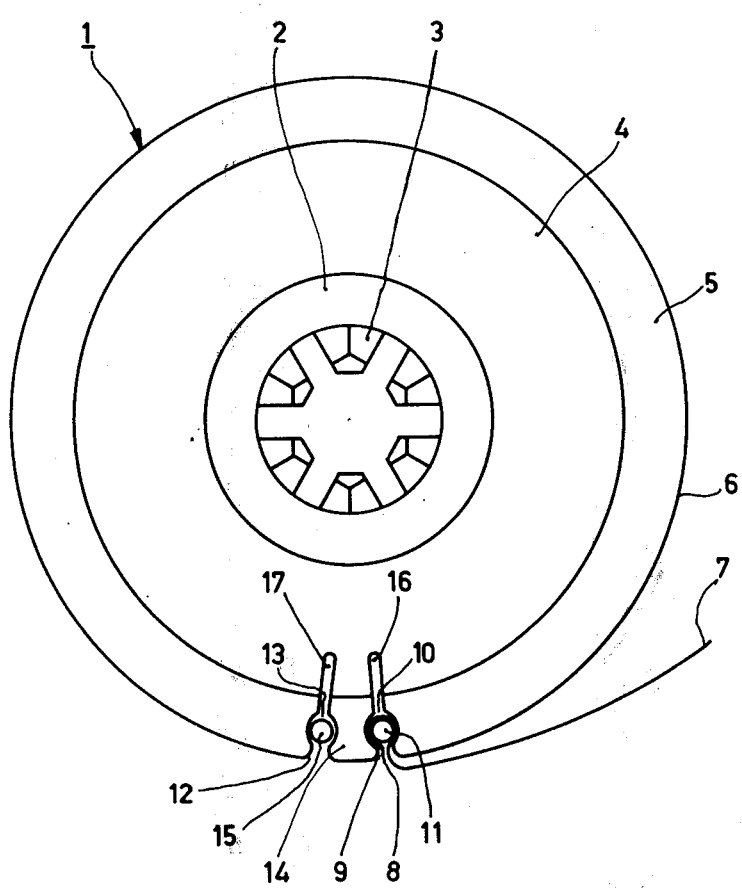

WINDING HUB FOR A RECORD CARRIER IN THE FORM OF A TAPE

The invention relates to a winding hub assembly for a record carrier in the form of a tape, of which one end can be inserted into, and with the aid of a clamping member be clamped in, position in a recess formed in the winding hub which recess terminates at the circumference of said hub and has a constriction at the location of this termination. In such a known winding hub assembly, which is for example used in cassettes for accommodating a magnetizable record carrier in the form of a tape, the clamping forces, which are produced when the clamping member is fitted, by urging into the recess, in which case the clamping member has to pass through the constriction at the circumferential termination of the recess, frequently cause a serious deformation, in particular crushing, of the record carrier which is mechanically vulnerable. As a result of this deformation the tape tensile strength at the crushed spot is substantially reduced, so that in the case of a tensile load exerted on the record carrier during operation said record carrier is readily torn more or less seriously at said location, which directly or after the repeated occurrence of a tensile load may result in the record carrier being torn off.

It is an object of the invention to provide a winding hub assembly which is constructed simply, which can be manufactured cheaply, and which has no such drawbacks. According to the invention the winding hub of the type mentioned in the preamble is characterized in that adjacent to the recess a further recess is formed for a further clamping member and the portion of the winding hub which is located between the two recesses is elastically movable while the end of the record carrier is effectively clamped in position by the clamping member in the recess through the action of the further clamping member in the further recess. As a result, the end of the record carrier is gently clamped in position in the relevant recess by the clamping member which is already present therein and which is effectively brought into contact with the end of the record carrier under the influence of a small force, whereas the urging operation so as to provide the required clamping force is effected by the further clamping member in the further recess.

The invention is described in more detail with reference to the drawing which shows an embodiment to which the invention is not limited.

The drawing shows a winding hub 1 with a cylindrical portion 2, at whose inside coupling ridges 3 are formed for co-operation with suitable drive means, for example with a winding spindle of a recording and/or playback apparatus. Connected to the portion 2 via a plate-shaped bridge 4 is a support 5 which is also cylindrical, on whose circumference 6 a record carrier 7 can be wound. For fixation of an end 8 of the record carrier 7 to the winding hub 1 the latter is provided with a first recess 10, which terminates in the circumference 6 of the winding hub and which has a constriction 9 at the location of said circumferential termination, into which the end 8 of the record carrier 7 can be inserted and into which a first rod-shaped clamping member 11 can be fitted through the constriction 9.

Adjacent to the recess 10 the hub now has a similar second recess 13 which also has a constriction 12 at the circumferential termination, an elastically movable portion 14 being formed between the two recesses 10 and 13. A second rod-shaped clamping member 15 can be fitted into the second recess 13. In order to ensure a satisfactory elastic movability of the portion 14, the two recesses 10 and 13 each have an essentially radial slot-shaped continuation 16 and 17 respectively at their sides which are remote from the circumference 6 of the hub 1.

To couple the end 8 of the record carrier 7 to the hub 1 said end must be inserted into the recess 10 and subsequently the clamping member 11 must be fitted into said recess 10 through the constriction 9 in the radial direction of the reel so that the tape is positioned between the member 11, and walls of recess 10. Specifically when the clamping member 11 passes through the constriction 9, the portion 14 of the reel which is situated between the two recesses 10 and 13, is elastically moved in the direction of the further recess 13, so that the record carrier is hardly subject to any mechanical load when the clamping member 11 is thus smoothly inserted into the recess 10, and is then retained on the hub with a small force only. Subsequently, the further clamping member 15 is pressed through the constriction 12 into the further recess 13 in the radial direction of the hub, so that the portion 14 of the hub which is located between the two recesses 10 and 13 is moved back in the direction of the recess 10 and the end 8 of the record carrier 7 is thus clamped in position in the recess 10 with the required force.

Insertion of the clamping member may for example also be effected in the axial direction of the spool, in which case the constrictions 9 and 12 of the recesses 10 and 13 can be made very narrow, which is favourable in view of a uniform record carrier transport during operation.

As previously stated, the clamping procedure is effected in two steps, during which first step positioning of the end of the record carrier and of the clamping member which directly co-operates with said end in the relevant recess of the hub is effected smoothly with the exertion of only a small force and the actual clamping force not being applied to the record carrier until the second step, during which the position of the end of the record carrier hardly changes any more, by fitting the second clamping member into the further recess. Thus, a clamping connection is established between the hub and the end of the record carrier in a particularly gentle manner, substantially without the occurrence of deformation of the record carrier, so that the tensile strength of the record carrier at the location of clamping is not adversely affected and tearing of the record carrier at the location of clamping is avoided, thus ensuring a high reliability.

As described with reference to the present embodiment, each clamping member may take the form of a separate member which can be fitted into the recess. However, it may also form part of the hub, for example in that the clamping member takes the form of a moulded-on tab or key which can be swung into a correspondingly formed recess. It is evident that within the scope of the invention a series of other usual embodiments of clamping members, such as for example oval bow-shaped clamping members etc., and corresponding recesses may be used.

What is claimed is:

1. A winding hub assembly for a tape comprising a hub having a circumference, and first and second recesses having walls and terminating at said circumference, each recess having a restriction at the respective termination, said recesses defining a hub portion therebetween; said hub comprising means for allowing elastic deformation of said portion; a first clamping member arranged to be clamped in said first recess for clamping a tape between the first clamping member and walls of the first recess; and a second clamping member arranged to be clamped in said second recess so as to bias said portion toward said first recess, thereby clamping said first member.

2. An assembly as claimed in claim 1 wherein said means for allowing deformation comprises continuations of said recesses extending from the walls of the recesses remote from said circumference.

* * * * *